US010762514B1

(12) United States Patent
O'Toole

(10) Patent No.: US 10,762,514 B1
(45) Date of Patent: Sep. 1, 2020

(54) FILTERING AND STRATIFICATION FOR IDENTIFICATION OF HIGH VALUE PARTICIPANTS AT LIVE EVENTS IN REAL-TIME

(71) Applicant: STAD.IO, LLC, Berkeley, CA (US)

(72) Inventor: Ryan O'Toole, Los Angeles, CA (US)

(73) Assignee: STAD.IO, LLC, Berkeley, CA (US)

( * ) Notice: Subject to any disclaimer, the term of this patent is extended or adjusted under 35 U.S.C. 154(b) by 1165 days.

(21) Appl. No.: 14/670,351

(22) Filed: Mar. 26, 2015

Related U.S. Application Data

(60) Provisional application No. 61/974,883, filed on Apr. 3, 2014.

(51) Int. Cl.
| | | |
|---|---|---|
| *G06Q 30/00* | (2012.01) | |
| *G06Q 30/02* | (2012.01) | |
| *H04L 29/06* | (2006.01) | |
| *H04L 29/08* | (2006.01) | |

(52) U.S. Cl.
CPC ..... *G06Q 30/0201* (2013.01); *G06Q 30/0261* (2013.01); *G06Q 30/0267* (2013.01); *G06Q 30/0269* (2013.01); *H04L 63/08* (2013.01); *H04L 67/28* (2013.01)

(58) Field of Classification Search
CPC ........... G06Q 30/0255; G06Q 30/0235; G06Q 10/105; G06Q 10/103; G06Q 10/067; G06Q 30/02; G06Q 10/06315; G06Q 40/00; G06Q 30/00; G06Q 30/06; G06Q 30/0201; G06Q 30/0261; G06Q 30/0267; G06Q 30/0269; H04Q 7/20; H04L 63/08; H04L 67/28
See application file for complete search history.

(56) References Cited

U.S. PATENT DOCUMENTS

| | | |
|---|---|---|
| 4,592,546 A | 6/1986 | Fascenda et al. |
| 6,920,428 B2 | 7/2005 | Greene |
| 7,603,321 B2 | 10/2009 | Gurvey |

(Continued)

OTHER PUBLICATIONS

Chin et al., Connecting People through Physical Proximity and Physical Resources at a Conference, Journal of Medical Internet Research. (Year: 2013).*

(Continued)

*Primary Examiner* — Patricia H Munson
*Assistant Examiner* — Uche Byrd
(74) *Attorney, Agent, or Firm* — Jennifer Hayes; Nixon Peabody LLP

(57) ABSTRACT

A system and method for enabling identification of and engagement with, high-value participants within the venue of a live-event from data collected and saved at events for providing improved customer service, marketing of products and increasing ticket sales to events are disclosed. An on-site wireless captive portal technology is used to authenticate attendees to live-events, and, upon authentication, collect their personal preferences and social profile details in real-time. The information collected at the live event is used to update a historic database at a main server station. The data stored in the historic database is analyzed to identify high-value participants of live events and their preferences, to provide them improved customer service, and focused marketing and sales incentives at live-events, thereby improving the live event experience of each of these attendees, while improving ticket sales.

3 Claims, 3 Drawing Sheets

(56) References Cited

U.S. PATENT DOCUMENTS

| | | |
|---|---|---|
| 7,680,699 B2 | 3/2010 | Porter et al. |
| 8,200,202 B2 | 6/2012 | Gil et al. |
| 8,499,049 B2 | 7/2013 | Lee et al. |
| 8,510,388 B2 | 8/2013 | Taylor |
| 8,522,289 B2 | 8/2013 | Athsani et al. |
| 9,432,923 B2 | 8/2016 | O'Toole |
| 2003/0035386 A1 | 2/2003 | Sullivan |
| 2004/0078825 A1 | 4/2004 | Murphy |
| 2006/0031120 A1 | 2/2006 | Roehr et al. |
| 2007/0143185 A1 | 6/2007 | Harmon et al. |
| 2008/0109238 A1 | 5/2008 | Harmon et al. |
| 2008/0109239 A1 | 5/2008 | Harmon et al. |
| 2008/0114653 A1 | 5/2008 | Harmon et al. |
| 2008/0244413 A1 | 10/2008 | Sampson et al. |
| 2008/0255939 A1 | 10/2008 | Harmon et al. |
| 2009/0106117 A1 | 4/2009 | Porter et al. |
| 2009/0249484 A1 | 10/2009 | Howard et al. |
| 2010/0080163 A1* | 4/2010 | Krishnamoorthi .... H04L 12/189 370/312 |
| 2010/0129065 A1 | 5/2010 | Porter et al. |
| 2011/0191158 A1 | 8/2011 | Kateraas et al. |
| 2011/0225518 A1* | 9/2011 | Goldman ............ G06F 3/04815 715/757 |
| 2011/0231305 A1 | 9/2011 | Winters |
| 2012/0066212 A1* | 3/2012 | Jennings ........... G06F 17/30144 707/723 |
| 2012/0150631 A1 | 6/2012 | Root |
| 2012/0185544 A1 | 7/2012 | Chang |
| 2012/0198497 A1 | 8/2012 | Chan |
| 2013/0036369 A1 | 2/2013 | Mitchell et al. |
| 2013/0046826 A1 | 2/2013 | Stanton |
| 2013/0097635 A1 | 4/2013 | Yerli |
| 2013/0159234 A1 | 6/2013 | Xing et al. |
| 2013/0226543 A1* | 8/2013 | Ramachandran ..... H04W 4/022 703/2 |
| 2013/0282421 A1* | 10/2013 | Graff ................. G06Q 10/1093 705/7.18 |
| 2014/0035761 A1 | 2/2014 | Burton et al. |
| 2014/0142733 A1 | 5/2014 | Tropper et al. |
| 2014/0143038 A1 | 5/2014 | Tropper et al. |
| 2014/0337090 A1* | 11/2014 | Tavares ............. G06Q 30/0201 705/7.29 |
| 2015/0120721 A1 | 4/2015 | Kim |
| 2015/0312760 A1 | 10/2015 | O'Toole |
| 2016/0358210 A1 | 12/2016 | O'Toole |

OTHER PUBLICATIONS

Phizzle connect: http://www.phizzle.com/platform/phizzleconnect/; accessed Aug. 13, 2015.

InStadium: http://instadium.com/network/; accessed Aug. 13, 2015.

Notice of Allowance in U.S. Appl. No. 14/263,969 dated Aug. 25, 2015.

Bunzel et al., The Best of Both Worlds: How to Effectively Leverage Social Media Reltionships with Real-Time Collaboration Tools; Pbp media-webinar, 2010.

* cited by examiner

FILTERING AND STRATIFICATION FOR IDENTIFICATION OF HIGH VALUE PARTICIPANTS AT LIVE EVENTS IN REAL-TIME

CROSS-REFERENCE TO RELATED APPLICATIONS

The present application claims priority to U.S. Provisional Application No. 61/974,883, entitled "Filtering and Stratification for Identification of High Value Participants of Live-Events in Real-Time," filed Apr. 3, 2014, the entirety of which is hereby incorporated by reference.

BACKGROUND

1. Field

The present disclosure relates generally to a method for enabling identification for engagement with, participants within the venue of a live-event using historic data collected and saved at live-events and specifically for providing incentives to identified high value participants to re-enforce their behavior pattern.

2. Related Art

A problem faced by live-event (e.g., sporting events, concerts, etc.) administrators is the inability to identify participating attendees in real time. Now, event administrators are able to identify the purchaser of tickets but they have little or no ability to identify who actually attended the event. Most, if not all, live events are associated web sites/blogs on which individuals are allowed to input comments. Typically, most of these bloggers are people on the web who follow the event remotely (e.g., on the web), rather than those who actually attend the event. Hence, there is a real cross-over disconnect between social media event followers (social media group) and fans who actually attend the events live (real fan group).

Event administrators must improve ticket sales to fill stadiums and they also need to engage the attendees in real-time to participate by providing comments and reviews and make purchases in the venue. These activities cannot be done by approaching the social media group because they may not be in the venue.

Event administrators typically have more information about season ticket holders, who in most cases are repeat customers and may attend the events most of the time. However, there is a need to identify and approach multiple event attendees and spenders, at events, to entice them to attend other live events or to convert them to season ticket holders. There are no systems or methods that presently exist that allow this level of real-time data collection, enabling identification of attendees for such interaction.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

In accordance with one aspect of the invention, a system is disclosed, including a plurality of wireless access points distributed in a venue, wherein at least one mobile device is configured to wirelessly connect to one of the plurality of wireless access points during a live event in the venue; an access controller connected to the plurality of wireless access points; and a proxy server connected to the access controller and a network so that a network access request from the at least one mobile device received during the live event is delivered to the proxy server through the access controller, wherein the proxy server authenticates the at least one mobile device and collects data relating to user profile information and user activities at the live event in the venue and wherein an algorithmic computation, by the proxy server, based on historic and current data of the user, enables the proxy server to determine the value status of the user associated with the at least one mobile device.

The system may further include a temporary database of the historic and current data of the user stored in a memory. The temporary database may be stored in memory in the proxy server or stored in memory communicatively coupled to the proxy server. The temporary database may include user information corresponding to individuals associated with each of the mobile devices authenticated at the proxy server.

The system may further include a main server coupled to the proxy server. The system may further include a historic database stored in memory. The historic database may be stored in memory of the main server or stored in the memory communicatively coupled with the main server.

The user information may be collected during the live event is transferred to the historic database.

The proxy server may determine whether the user associated with the mobile device has the value status as a high value attendee by: accessing data corresponding to the user associated with the at least one mobile device; filtering and stratifying the data by assigning a weight to selected behavior patterns; generating a personal point value for an individual from the weights associated with the individual; and determining if the point value for the individual is above an established high value threshold.

The system may further deliver incentives to the mobile device at the live even venue based on the user's value status.

In accordance with another aspect of the invention, a method is disclosed that includes connecting a mobile device to a proxy server at a live event venue; associating the mobile device with a unique identifier at the local proxy server; receiving a request at the proxy server from the mobile device to access a social media website; determining the value status of a user associated with the mobile device, wherein determining the value status of the user associated with the mobile device includes accessing data corresponding to the user associated with the mobile device; and filtering and stratifying the data by assigning a weight to selected behavior patterns; performing an algorithmic computation of the filtered and stratified data to determine the value status of the user; and delivering incentives to the mobile device at the live event venue based on the value status of the user.

The method may further include collecting user profile information from the social network and storing the user profile information with the list of authenticated users in a temporary database. The method may further include storing activity data of the user during the live event in the temporary database. The method may further include transferring the user profile information and user activity data for storage in a historic database with an event identifier.

Delivering incentives to the mobile device may include modifying content of web pages a user browses based on the user's data and/or integrating with an advertisement network to modify content of a requested advertisement uniform resource locator (URL) to include s targetable user identifier based on the user's profile data; and integrating with the advertisement network to modify the content of requested advertisement URL to include the targetable user identifier based on the event.

In accordance with yet another aspect of the invention, a method is provided that includes connecting a mobile device to a proxy server at a live event venue; associating the mobile device with a unique identifier at the local proxy server; accessing a table that stratifies data according to selected behavior patterns for users using the unique identifier; determining whether a user associated with the mobile device is a high value user using the table by performing an algorithmic computation of the data in the table; and if the user is a high value user, targeting the user to enhance high value behavior.

The method may further include collecting user profile information from the social network and storing the user profile information with the list of authenticated users in a temporary database. The method may further include storing activity data of the user during the live event with the list of authenticated users in the temporary database. The method may further include transferring the user profile information and user activity data for storage in a historic database with an event identifier. The method may further include collecting the personal preferences and social profile details of the individuals participating in a live-event in real-time.

The table may stratify the data based at least on one or more of the following: a number of times the user has logged into the proxy server; a number of days the user has logged into the proxy server; a frequency of the user's logins to the proxy server; a pattern of the user's logins to the proxy server; demographic data pulled from social media; the user's response to advertising and marketing information provided; the user's engagement with social media features, such as liking, commenting on, sharing, and creating social content; the user's engagement with transactional features, such as in-seat food and beverage sales, merchandise, and ticketing; clustering of users based on a taxonomy of a multiple of the above metrics; and stratification based on age and gender of the individual.

The method may further include generating the table. The method may further include assigning a set of weight values to user data to calculate the overall activity value of each event attendee using the algorithmic computation. The method may further include categorizing each event attendee based on the overall activity value.

The table stratifies the data based at least on one or more of the following: a number of events attended in a prior month; a number of events attended in a prior year; spending at last event attended; average spending in the prior year; number of followers on social networks; number of comments and blogs during the last event attended; average comments and blogs in the prior year; average spending at the current year's events; total spending in the current year; and whether the user is a season ticket holder.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Figure 1:
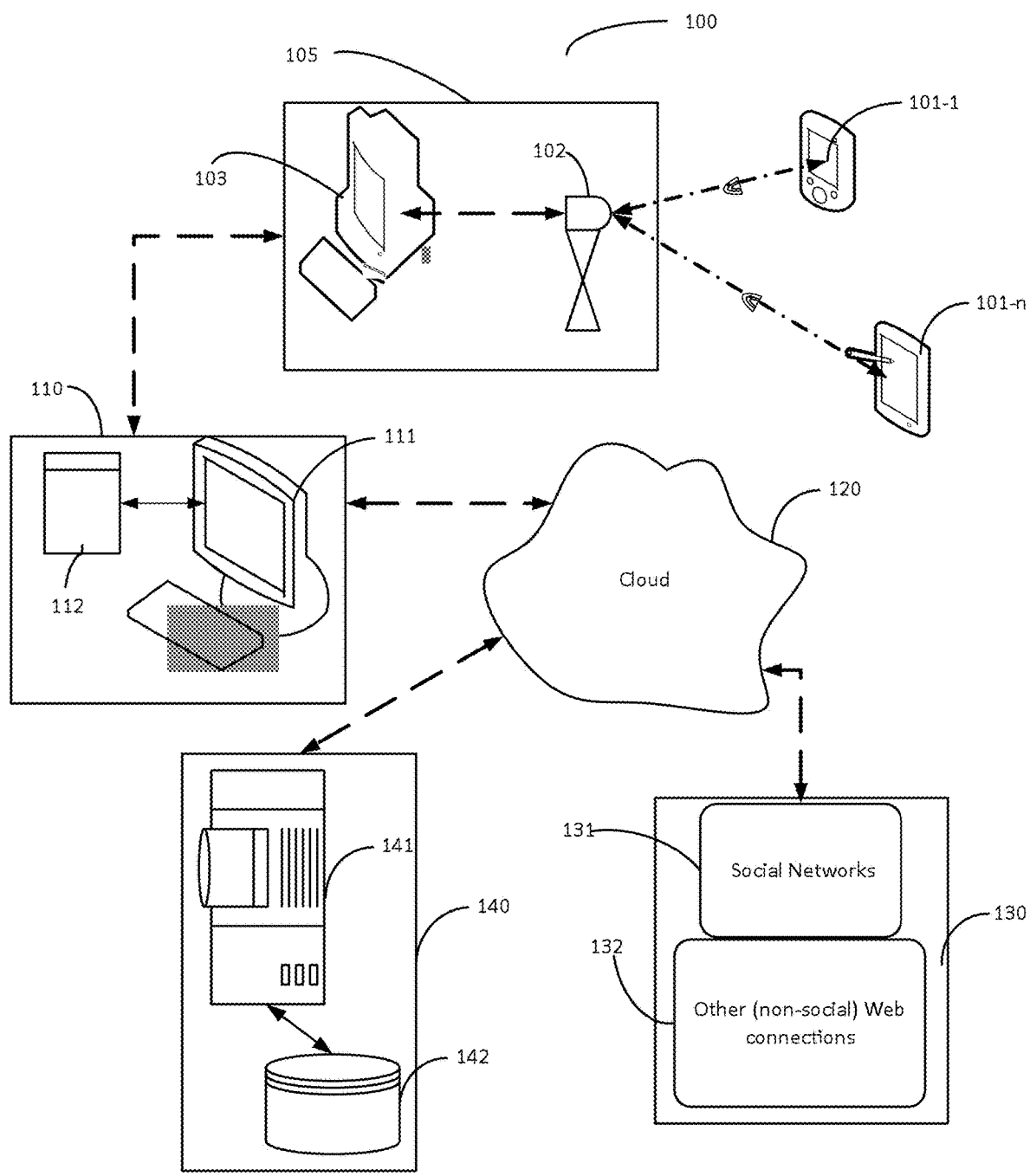
FIG. 1 is a block diagram of a registration and authentication system for live-event attendees according to one embodiment of the invention.

Embodiments of the invention relate to a system and method for enabling identification of and engagement with, high-value participants within the venue of a live-event from data collected and saved at events for providing improved customer service, marketing of products and increasing ticket sales to events. An on-site Wi-Fi based captive portal technology is used to for authenticate attendees to live-events and on authentication, collect their personal preferences and social profile details in real-time. The collected information may be temporarily stored in a temporary attendee-database on a proxy-server at the live event and used to update a historic-database at a main server station at the end of the live-event or stored directly on the main server updating the historic-database in real-time. The real-time up-date of the historic database is via the Wi-Fi and internet connectivity enabled by a dedicated script or application program downloaded on the mobile handheld communication device of the participant during registration and authentication at the site of the live event. The data stored in the historic-database is analyzed to identify high-value participants of live-events and their preferences to provide them improved customer service, and focused marketing and sales incentives at live-events, to improve the live event experience of each of these attendees, while improving ticket sales.

There are many examples of live-events at which the systems and methods described herein. For instance, live-events having large attendance include NFL football games, usually in stadiums holding more than ten thousand spectators, college football games in similarly or larger stadiums, baseball games in the stadiums of National and American League teams, live concert venues, soccer games, NBA basketball games, and other spectator events that have many thousands of spectators. In another example, a venue at which the systems and methods described herein may be used include restaurants, coffee shops, bars, and the like, that have fewer patrons. For instance, customers may attend a concert at a bar or coffee shop that has a capacity of less than one hundred attendees. The venue may be any location at which there are people in attendance with smart phones or other mobile devices. It will be appreciated that the number of people in attendance at the venue may be any number including less than or greater than one hundred attendees or less than or greater than ten thousand spectators.

The systems and methods disclosed herein allow collection and compilation of data regarding attendees and their activities at live-events using the attendee's mobile device. The systems and methods enable customer interactions within and outside the live-event venue during the live-event. This data can be used to, for example, provide improved customer service, enable focused ticket sales, and enable generation and delivery of focused commercial advertisements within the venues during live-events.

In one embodiment, connectivity and data collection are enabled by providing distributed hot-spots, typically Wi-Fi, covering a venue with large attendance for access by the dedicated mobile devices of the attendees of a live-event. The mobile devices of attendees (MDAs) attending the live-event are registered and authenticated, enabling a local proxy server to gather the social profile information on the attendees to the live event from the social media. In one embodiment of the invention this information combined with the information regarding the activities such as purchases, blogging connections, comments and other interaction of the attendees are recorded and saved by the proxy server in a temporary database during the live-event. The user activity can be generated using the capability provided by the registered and authenticated MDAs. This data is used to update an attendee history database, on a main monitoring server, at the end of the live-event or even during the event.

This data can be analyzed to provide information to event managers relating to who is attending an event compared to who is buying tickets, and to provide focus for improving return on advertisement expenditure and to provide attendees improved customer service based on their past involvement for a much more valuable live-event experience. This data also allows the event managers to differentiate between individuals who just follow and comment on live-events and individuals who attend the live events enabling the event managers to focus their marketing efforts. The data collected allows attendee-faced advertisements to be developed and presented, identify high-value individuals attending the live-events, provide incentives to the frequent attendees, bloggers and commenters with high social-following, identify high spenders at events, and enable focused ticket sale efforts and promotions to attendees, to improve return for advertising expenditure.

The collected and stored data will be of use in providing improved customer service, and incentives to individuals, provide focus for ticket sales and commercial advertisements within the venues at live-events. The system and method allow improved access to customer's historic background, preferences and behavioral patterns of the past while enabling collection of data on activities by the attendee at live-events to update such historic data. Data-mining on such a historic database will provide capability to identify high value individuals, such as regular attendees, attendees at live-events, attendees who are high spenders within the arena, attendees with large following and who are bloggers enabled to influence others etc.

In this disclosure, the terms attendee and mobile device of attendee (MDA) may be used interchangeably to refer to a mobile device of an attendee. It will be further appreciated that each attendee can be identified by his or her personal mobile device.

FIG. 1 is an exemplary block diagram of a system 100 for registration, authentication and web access of the attendees 101-1 to 101-*m* in the venue of a live-event in real-time. The system 100 also enables the collection of data on the attendees preferred activities, which can be saved for data mining and compilation to identify high value attendees.

This is done using the personal communication devices, such as cell phones, iPads, and other types of handheld communication devices (HCDs) or mobile devices of the attendees (MDAs) 101-1 to 101-*n* that are associated with each individual attendee and can be uniquely identified with the attendee user. The system 100 uses a wireless, typically Wi-Fi, portal technology.

As shown in FIG. 1, the system 100 includes a plurality of access points 102-1 to 102-*n*, an access controller 105 and a proxy server system (PSS) 110. The PSS 110 includes a proxy server 111 and memory including at least a temporary database 112. The temporary database may be stored in memory in the proxy server 111 or memory in the PSS 110 that is accessible by the proxy server 111. The system 100 also includes a main server system (MSS) 140 that includes a main server 141, having at least a processor and storage memory as well as a historic database 142. The main server 141 is also enabled as a data mining processor for data mining activities on the historic data stored in the historic database in the memory of the MSS 140. The historic database 142 is stored in memory in the main server 141 or a dedicated memory in the MSS 140 that is accessible by the main server 141. In FIG. 1, the web 150, including a social network 130 and a web authoring service 131, is shown coupled to the main server system 140 and proxy server system 110 over a network 120 (e.g., the cloud). Though the connections between the main server system 140 and the proxy server system 110 are shown as being over the web, it does in no way limit the connection from being a dedicated link, such as by cable, radio relay, wireless connection, or satellite connection. The MSS 140 and the PSS 110 are also linked to external networks 130 that comprise social networks 131 and other networks 132. The details and operation of the system 100 are disclosed in co-pending U.S. patent application Ser. No. 14/263,969, filed on Apr. 28, 2014, entitled "Authenticated Registration of Participants for Web Access at Live-Events enabling Data Collection for Improved customer service," the entirety of which is hereby incorporated by reference.

In one embodiment of the invention, an MDA 101 connects to one of the one or more access points 101 at the venue before or during the live event. The MDA sends a request to access the web (i.e., by entering the URL corresponding to the social network 130 or another website 150) to the access point 102, which sends the request to the PSS 110 via the controller 105. The PSS 110 compares the user identifier associated with the MDA 101 to the user IDs on the attendee whitelist 114. If the user identifier of the requesting MDA 101 does not match the user identifier in the attendee whitelist 113, the MDA 101 must be registered and authenticated on the system 100.

If the user request for the website is a request to access the social network 130, the PSS 100 verifies that the requested social network is on the connection white-list 113 and delivers the request social network website to the MDA 101. The registration and authentication is then done by connecting the MDA 101 to the requested, approved social network 130. Once connected to the approved social network, the MDA 101 can sign in and register with the web-authoring service 131 of the selected social network 130. The completion of registration and web-authoring of the MDA 101 with the social network is monitored by the PSS 110 and the completion of the sign-in with the social network enables the proxy server 111 to locally register and authenticate the MDAs 101 and add the MDA 101 to the attendee-white-list 114, thereby identifying the attendee within the live-event arena. The authentication also allows the proxy server 111 to collect and save the preferences and social profile, of the registered and authenticated MDAs 101-1 to 101-*m*, available for down load on the social network, on the temporary database 112, on the proxy server system 110, linked to the mobile device IDs in the temporary attendee-database 114. Once an attendee's ID from within the venue is entered on the attendee-white-list in the attendee database 114, the registered and authenticated MDA 101-1 to 101-*m* is able to connect, with full connection capability, as dictated by the permissions available to the attendee, to any approved web site 150 over the web, including the social networks 130 for commenting, blogging and contacting friends and other activities including ordering services within and outside the venue. In one embodiment a summary (log) of these activities, while in the venue is also retained in the attendee database 114 until the end of the live-event or some other selected time. In an alternate embodiment the MDA 101-1 to 101-*m* that are registered and authenticated are able to connect to the main server system (MSS) 140 through the PSS 110 via the link, which is typically the web 120, between the PSS 110 and the MSS 140, to download a script, which typically is a java script (short Java program) that will run on the MDAs, that enable the transfer of the activity data in real-time to the MSS 140. In all embodiments the information in the attendee database 114 and the activity data are transferred to the MSS 140 to update the historic database. In some embodiments, the transfer occurs over the web 120. The historic database 142 includes the historic information 143, which includes at least a date of event, an event ID, and ID for the attendee with associated social profile, preferences, and activities within the venues for all registered and authenticated MDAs 101-1 to 101-*m* in the live-events.

If an unregistered and unauthenticated MDA 101 attempts to connect to a web site other than those in the white-listed social networks 130 on the temporary connection-white-list 113, the proxy server 111 provides a temporary redirect of the request to the main server system (MSS) 140. The proxy server 111 essentially blocks access to the web 150, other than for limited access to the social networks 130 which are on the connection white-list 113, for MDA 101 that are not registered and authenticated with the proxy server 111. The redirect allows the MSS 140 to download the java script onto the un-registered MDA 101. The script down loaded, in addition to enabling continued direct connection of the MDA 101 to the MSS 140, enables a preferred social web authoring site 131 to connect to and open a registration page on the unregistered MDA 101, enabling the MDA 101 to initiate registration on the preferred social network web authoring site 131 through the proxy server 111. This enables the un-authenticated MDA 101, to sign-up or sign-in to the white-listed social network and hence get authenticated on the proxy server 111, as described before.

The authentication includes addition of the specific MDA 101 to the temporary attendee white-list within the temporary attendee-database 114 on the PSS 110. Upon authentication of the MDA 101, the proxy server 111 is able to collect and save the preferences and social profile of the specific registered and authenticated MDA 101 in the temporary attendee-database 114. Once the MDA 101 has been registered, authenticated, and white-listed in the temporary attendee-database 114, the MDA 101 is enabled to connect to all approved web sites 150 (both social 130 and others) for active involvement in the venue and outside from the venue of the live event. The authentication and white-listing process also allow the proxy server system 110 to save the collected data on the MDA 101 in a historic database 142 of attendees on a main server system 140 over the web at the end of each event.

In another embodiment of the invention, the MDAs 101 entering the venue connect to one of the one or more access points 101 at the venue before or during the live event. The MDA sends a request to access the web (i.e., by entering the URL corresponding to the website 150 to the access point 102, which sends the request to the PSS 110 via the controller 105. The PSS 110 compares the user identifier associated with the MDA 101 to the user IDs on the attendee whitelist 114 to check if the MDAs 101 requesting access is already authenticated. If the user identifier of the requesting MDA 101 does not match the user identifier in the attendee whitelist 113, the MDA 101 must be registered and authenticated on the system 100. The PSS 110 redirects the request to a cloud hosted javascript application, typically on the main server (MSS) 140 or in an application store from where the Java script is downloaded and installed on the MDAs 101 web browser. This forms a client-side Javescript. The MDAs 101 use the Javascript application to connect to and sign into a social media authentication service which is white listed on the PSS 110. On successful authentication of the MDA 101, the MDAs 101 accepts and stores an authentication access token and user profile data from the social network in its database. The MDAs 101 also synch with the MSS 140 to store the access token and user profile in the database 142 of the MSS 140. The client side Java script makes an API call to the proxy server to enable the inclusion of the authenticated MDAs 101 in the attendee white list on the PSS 110 and allow access to the world wide web for the authenticated MDAs 101. The client side application program loads content from the MSS 140 to allow the attendees to use the services and features enabled by the application program while at the venue. The synching between the authenticated MDAs 101 and the MSS 140 enable the MDAs 101 to transfer all application and activity data at the venue to the MSS 140 in real time to update the historic database 142 on the MSS 140.

In some embodiments, the transfer occurs over the web 120. The historic database 142 includes the historic information 143, which includes at least a date of event, an event ID, and ID for the attendee with associated social profile, preferences, and activities within the venues for all registered and authenticated MDAs 101-1 to 101-*m* in the live-events.

The data is compiled, analyzed and mined to establish attendee status details and preferences and is also stored within the historic database 142. During authentication and white-listing of MDAs 101-1 to 101-*m* during an event, the attendee status and preferences of the authenticated attendees are collected from the historic database to identify any high-value individuals (high spenders, regular attendees and bloggers with high following) in attendance to provide them further incentives to improve their activities and access while in the venue. The available status information also allows focused ads to be provided and enable focused marketing to be initiated for the attendees while in the venue (and outside the venue) based on their status and preferences. The status details also enable personalized ticket sales for new events and season ticket sales to the attendees and specifically to high-value individuals.

Figure 2:
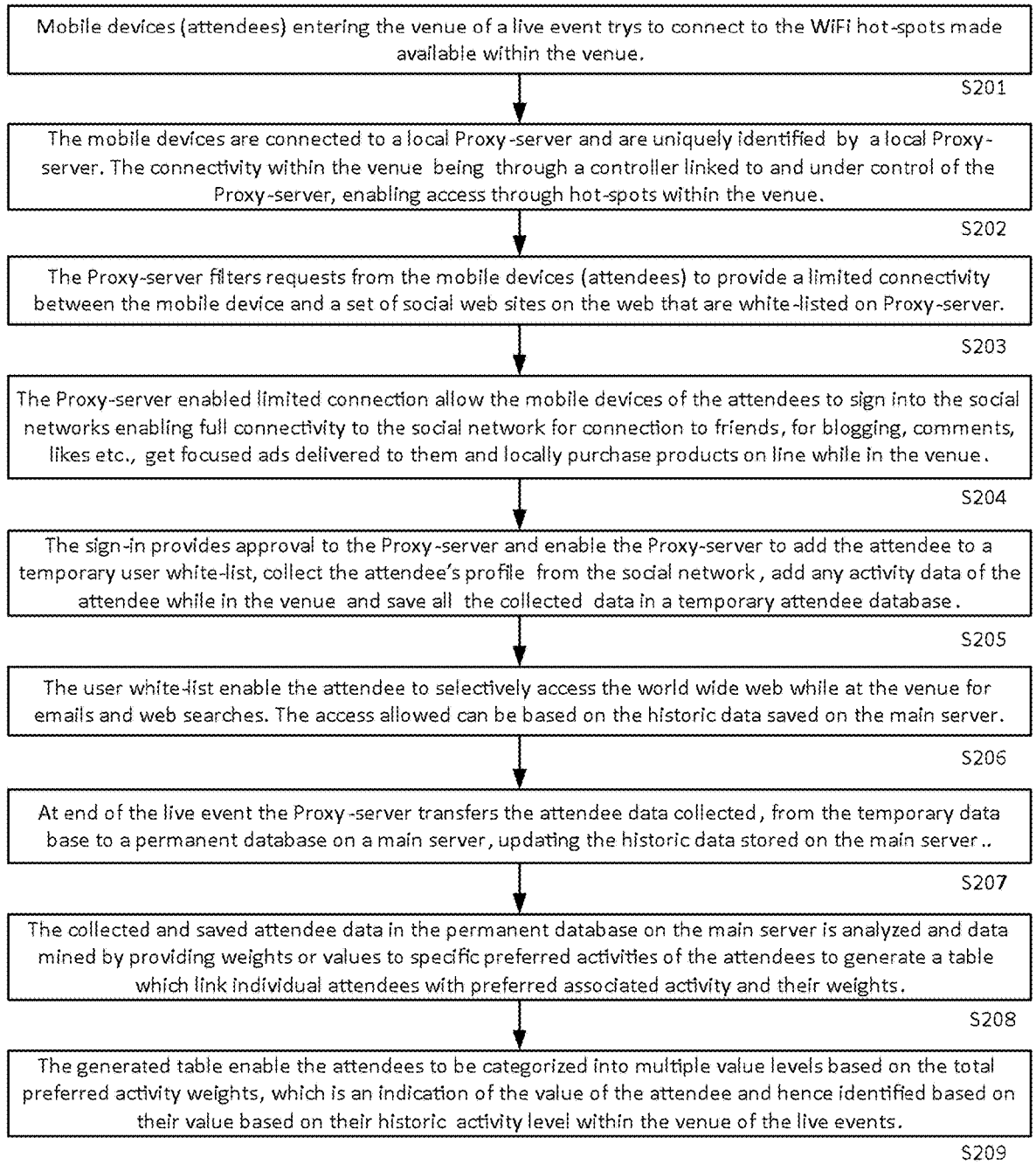
FIG. 2 is a flow chart for enabling collection of data at the live-event venues from the registered and authenticated attendees and use of the same for identification of high value attendees according to an embodiment of the invention.

FIG. 2 is an exemplary flowchart of a method for collecting and compiling data on the attendees of live-events. The collected data is used to update the historic database which is then used to do data mining for information required to determine the value of individuals attending the live-events. Although the flowchart illustrates the process as a sequential process of operations, it will be appreciated that many of the operations can be performed in parallel or concurrently. In addition, the order of the operations may differ from that shown in FIG. 2.

When an attendee with a mobile device enters the venue of a live event, the multiple hotspots within the venue of the live event are enabled as discoverable and linkable by the mobile device of the attendee (MDA). The MDA connects to the local connectivity within the venue using one of the available hot-spots. S201.

The MDAs are connected to a local proxy server and are uniquely identified by the local proxy server using an ID. The ID can be based on any mobile device identifiers, such as, for example, the MAC address, IP address, other higher level identification capabilities, etc. The MDAs connectivity within the venue is established through a controller linked to and under control of the proxy server which acts as a gateway enabling access through hot-spots within the venue. S202.

The proxy server controls and filters the requests from the MDAs initially to provide a limited connectivity between the MDAs and a set of approved social web sites on the web. The social sites to which the attendees can connect for enabling registration are managed through a pre-established connection white-list on the proxy server. S203.

The limited connections to the social network enabled by the proxy server allow the MDAs to sign into the social networks. Once the MDAs sign into the social network, full connectivity to that social network for connection to friends, for blogging, comments, likes etc. is enabled. Registration with the social network also allows the connected MDA to get focused advertisements delivered to them and enables the MDA to locally purchase products online in the live-event venue. S204.

The sign-in by the MDAs provides approval to the proxy server. The proxy server then adds the MDAs' IDs to a temporary attendee white-list to authenticate the MDAs. The proxy server is then enabled to and allowed to collect the attendees' social profiles from the social network, add any activity data of the attendee while in the venue, and save all the collected data in a temporary attendee-database on the proxy server. S205.

The registration and authentication of MDAs and the addition of the MDAs to the attendee white list enable the MDAs to selectively access the world-wide web while at the venue. For example, the MDA may be able to use the web at the venue for emails, web searches and other activities. It will be appreciated that the web access allowed by proxy server can be unlimited open-access, limited-access to specific sites on the web, or limited access based on the historic data of the attendees saved on the main server system (MSS). S206.

At the end of the live-event or at some other selected time, the PSS transfers the collected attendee data corresponding to the registered and authenticated MDAs from the temporary attendee database to the permanent historic database on the MSS, updating the historic data stored in the historic-database on the MSS for all attendees to the live event. S207.

This collected and saved data is now available for analysis. The data is analyzed and data mined to generate a table, which links individual users with preferred activities in the live-events attended. The preferred activity is provided a set of weight values which are used to calculate the overall activity value of each individual attendee in the historic database. S208.

The table with weights or activity values allows the attendees to be categorized into multiple value groups based on the total preferred activity value, which is an indication of the value of the attendee. The attendee can hence be identified based on their categorized group which is based on their historic activity value level within the venue of the live events. S209.

The group or category that an individual attendee falls into provides an assessment of that value the individual attendee brings to the live-event. Hence, a high value group of attendees can be targeted and treated differently than a low valued group of attendees. For example, incentives will be provided to the high value group of attendees for them to attend the live-events and continue engaging in the high value behavior that put them in the high value category. The incentives can be provided to them for access, seating, purchase etc. while in the venue.

TABLE 1

(Table for Calculation of Value of Attendees)

| 1 | 2 | 3 | 4 | 5 | 6 | 7 | 8 | 9 | 10 | 11 | 12 | 13 |
|---|---|---|---|---|---|---|---|---|---|---|---|---|
| $\#A_1$ | $\#B_1$ | $aaa_1$ | $bbb_1$ | $ccc_1$ | $ddd_1$ | $eee_1$ | $ggg_1$ | $hhh_1$ | $jjj_1$ | $kkk_1$ | Yes | $LLL_1$ |
| $\#A_2$ | $\#B_2$ | $aaa_2$ | $bbb_2$ | $ccc_2$ | $ddd_2$ | $eee_2$ | $ggg_2$ | $hhh_2$ | $jjj_2$ | $kkk_2$ | no | $LLL_2$ |
| $\#A3$ | $\#B_3$ | $aaa_3$ | $bbb_3$ | $ccc_3$ | $ddd_3$ | $eee_3$ | $ggg_3$ | $hhh_3$ | $jjj_3$ | $kkk_3$ | no | $LLL_3$ |
| — | — | — | — | — | — | — | — | — | — | — | — | — |
| $\#A_{n-1}$ | $\#B_{n-1}$ | $aaa_{n-1}$ | $bbb_{n-1}$ | $ccc_{n-1}$ | $ddd_{n-1}$ | $eee_{n-1}$ | $ggg_{n-1}$ | $hhh_{n-1}$ | $jjj_{n-1}$ | $kkk_{n-1}$ | Yes | $LLL_{n-1}$ |
| $\#A_n$ | $\#B_n$ | $aaa_n$ | $bbb_n$ | $ccc_n$ | $ddd_n$ | $eee_n$ | $ggg_n$ | $hhh_n$ | $jjj_n$ | $kkk_n$ | no | $LLL_n$ |

Table 1 is an example of the evaluation of attendees based on a few elements from the data collected. Each element is given a weightage which is used to determine a personal point value, $LLL_x$, for the individual. Individuals are then categorized into multiple status levels, as high value status and low value status based on a point threshold established for the personal point value of the individual. An individual is considered to be a high value individual if his point value is above a threshold established for high value status. A similar process is followed to determine the status for individuals in other status groups. In Table 1, 1 is the ID of attendee; 2 is the ID of last event attended (event ID=bbb); 3 is the number of events attended in the past month; 4 is the number of events attended in the last 12 months; 5 is the spending at last event attended; 6 is the average spending in the last 12 months; 7 is the number of followers on social networks; 8 is the number of comments and blogs in the last event attended; 9 is the average comments and blogs in the last year; 10 is the average spending in the current year events; 11 is the total spending in the current year; 12 is whether the attendee is a season ticket holder, 13 is the status of attendee and 14 is an assessed weight of the attendee (LLL), where LLL=a %(f0(3))+b %(f1(4))+c %(f2(5))+d %(f3(6))+e %(f4(7))+g %(f5(8))+h %(f6(9))+j %(f7(10))+k %(f8(11)). The column entries designated 1 to n are extracted and values are calculated for the n attendees. In Table 1, for example, the status (LLL) of the attendees can be used to categorize the attendees, to provide incentives to them to improve or continue their high value activity as follows:

High value individual with season ticket (such as # An-1)—Assigned value status 1

High value individual without a season ticket (such as # A2)—Assigned value status 2

Low value individuals with season ticket (such as # A1)—Assigned value status 3

Low value individuals (such as # An)—Assigned value status 4

Again, as an example, in the above categories, the high value individuals in value status group 1 are provided incentives such as special seating and food etc. in the arena to incentivize them to keep them at the level they are at. The high value individuals in the value status group 2 are contacted and incentives are provided such as discounted season tickets to help them move to the next level. Similar activity at a reduced level is taken up to provide incentives to the value status group 3 attendees to increase their spending level by providing coupons for food, etc. at the arena to try and move them up in the category standing. Value status group 4, being incidental attendees, may be left to themselves in the arena (i.e., no or little incentives provided).

Table 1 shows an exemplary value calculation using historic data associated with individuals attending the live events to generate the value categories of attendees. As shown in the column definitions of the table, each of columns 3-11 represents a high value behavior by the attendees. Each high value behavior is given a weighting as a function of the behavior. Each row is the function of activity of an attendee compiled and consolidated from all the collected and stored historic data. In some embodiments, the new data being given a higher value than the older data. By combining and consolidating the data in the table, an assessment of and consolidated view of the value each attendee brings to the live-event attended can be determined.

Even though Table 1 indicates a set of categories used for doing stratification and targeting, these need not be limiting in any sense. Many other categories can be used for stratification of the customers and many other targeting items can be identified which can provide an impact to the net return to the organizers. Other exemplary items for stratification include:

the number of times the user has logged into the wi-fi portal;

the number of days the user has logged into the wi-fi portal;

the frequency or pattern of the user's logins to the wi-fi portal;

demographic data pulled from social media, such as age, gender, and the like;

the user's response to advertising and marketing information provided;

the user's engagement with social media features, such as liking, commenting on, sharing, and creating social content the user's engagement with transactional features, such as in-seat food and beverage sales, merchandise, and ticketing;

clustering of users based on a taxonomy of a multiple of the above metrics; and stratification based on age and gender of the individual.

Additional examples of targeting a high value user may include:

collecting contact info, such as an email address and/or social media user ID;

modifying the content of web pages a user browses, based on the user's profile (e.g., switching ad content on a website, like www.nytimes.com, with the venue's own ad content targeted to that user);

integrating with ad networks to modify the content of requested ad URLs to include targetable user ID's based on the user's profile data (e.g., a user going to the NYTimes website would have advertising targeted to them based on cookies with user ID's set that the NYTimes ad network can use in order to target ads to that particular user with the added enhancement of adding a location context of where the user is into any ad URL requested through the current proxy); and integrating with ad networks to modify the content of requested ad URLs to include targetable user ID's based on the event (e.g., sporting event, late-night dive bar, eating, rock concert, hip hop festival).

Figure 3:
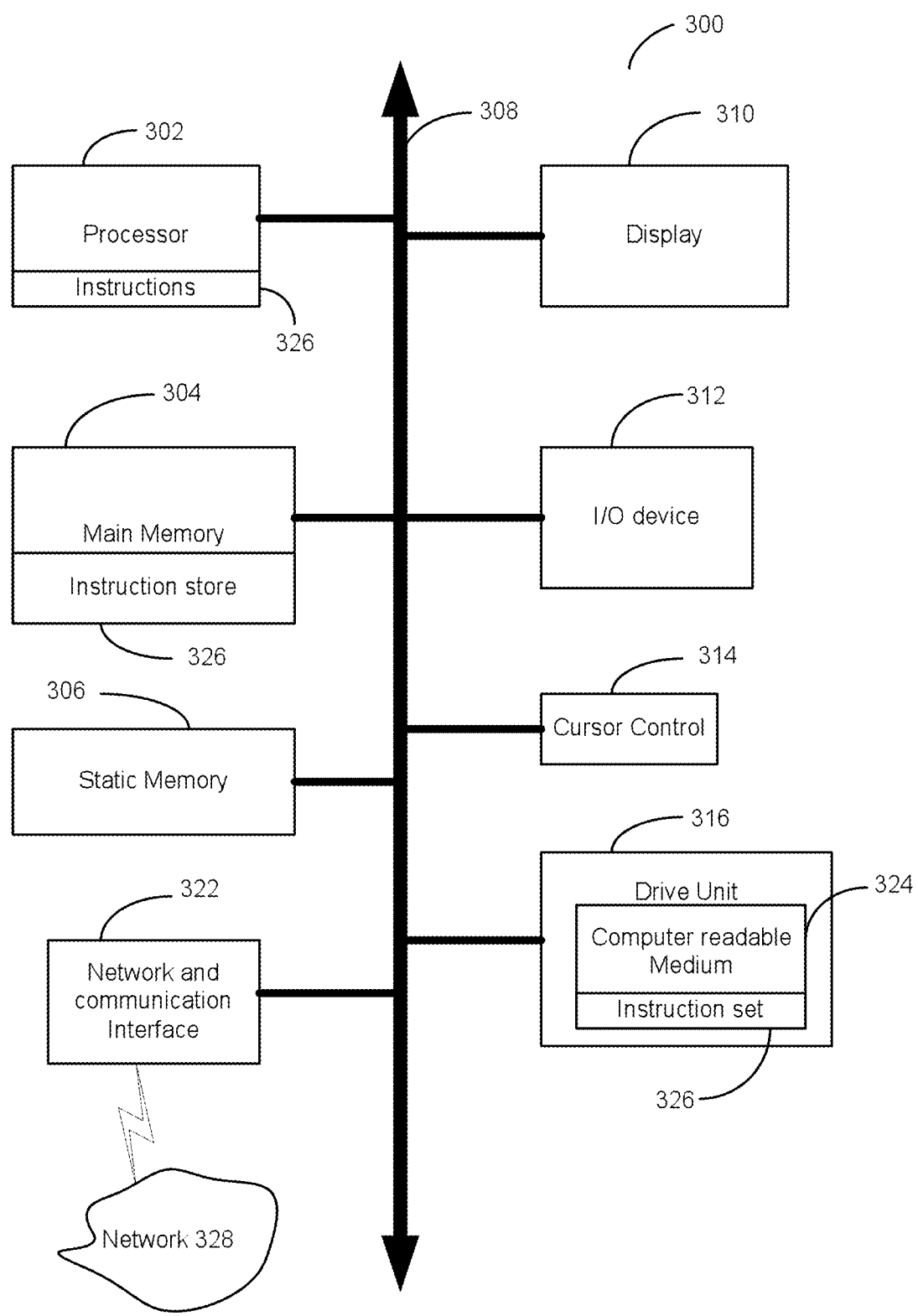
FIG. 3 is a schematic diagram showing a diagrammatic representation of a machine in the exemplary form of a computer system according to an embodiment of the invention.

FIG. 3 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, an access point, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU), a graphics processing unit (GPU) or both), a main memory 304 (e.g., read only memory (ROM), flash memory, dynamic random access memory (DRAM) such as synchronous DRAM (SDRAM) or Rambus DRAM (RDRAM), etc.) and a static memory 306 (e.g., flash memory, static random access memory (SRAM), etc.), which communicate with each other via a bus 308.

The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 320 (e.g., a speaker) and a network interface device 322.

The disk drive unit 316 includes a computer-readable medium 324 on which is stored one or more sets of instructions (e.g., software 326) embodying any one or more of the methodologies or functions described herein. The software 326 may also reside, completely or at least partially, within the main memory 304 and/or within the processor 302 during execution thereof by the computer system 300, the main memory 304 and the processor 302 also constituting computer-readable media.

The software 326 may further be transmitted or received over a network 328 via the network interface device 322.

One or more of the methodologies or functions described herein may be embodied in a computer-readable medium on which is stored one or more sets of instructions (e.g., software). The software may reside, completely or at least partially, within memory and/or within a processor during execution thereof. The software may further be transmitted or received over a network.

It should be understood that components described herein include computer hardware and/or executable software code which is stored on a computer-readable medium for execution on appropriate computing hardware.

The terms "computer-readable medium" or "machine readable medium" should be taken to include a single medium or multiple media that store the one or more sets of instructions. The terms "computer-readable medium" or "machine readable medium" shall also be taken to include any non-transitory storage medium that is capable of storing, encoding or carrying a set of instructions for execution by a machine and that cause a machine to perform any one or more of the methodologies described herein. The terms "computer-readable medium" or "machine readable medium" shall accordingly be taken to include, but not be limited to, solid-state memories, and optical and magnetic media. For example, "computer-readable medium" or "machine readable medium" may include Compact Disc Read-Only Memory (CD-ROMs), Read-Only Memory (ROMs), Random Access Memory (RAM), and/or Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A computer-implemented method using a communication system distributed throughout a venue, the computer-implemented method comprising:
connecting to at least one mobile device using a proxy server via connection hot-spots during a live event at the venue, wherein a social media web-based application is operating on the at least one mobile device;
receiving user input from a user located at the at least one mobile device, wherein the user input comprises user profile information and user activities during the live event;
receiving a request to access the social media web-based application at the proxy server from the at least one mobile device;
receiving a request for authentication from the at least one mobile device, and authenticating the at least one mobile device upon determining that the at least one mobile device is within the arena;
providing a unique device identifier tag to the at least one mobile device to enable tracking and monitoring of user activities within the venue during the live event;
determining a value status of the user based on the received user profile information and user activities during the live event, wherein determining the value status of the user comprises:
processing the received user profile information and user activities during the live event in view of historical behavioral data of the user;
assigning a weight to selected behavior patterns by a processor on the proxy server, determining if the received user activities qualify as the selected behavior patterns based on whether the received user activities are relevant to the live event, wherein determining whether the received user activities are relevant to the live event comprises determining a weight of the user activities; and
determining the value status of the user based on the determined weight of the user activities; and
sending an alert to the at least one mobile device of the user notifying the user of incentives to exert influence during the live event based on the determined value status.

2. The computer-implemented method of claim 1, further comprising:
storing the received user profile information and user activities during the live event with a list of authenticated users in a temporary database, wherein the temporary database is either stored in a memory on the proxy server or in a memory communicatively connected to the proxy server; and
storing the received user profile information and user activities during the live event in a historic database with an event identifier, wherein the historic database is either stored in memory of a main server communicatively coupled to the proxy server, or stored in a memory communicatively coupled with the main server.

3. The method of claim 1, further comprising delivering incentives to the at least one mobile device by performing one or more of the following steps:
modifying content of web pages the user browses based on the received user activities during the live event;
integrating with an advertisement network to modify content of a requested advertisement uniform resource locator (URL) to include a targetable user identifier based on the received user profile information; and
integrating with the advertisement network to modify the content of requested advertisement URL to include the targetable user identifier based on attendance of the live event.

* * * * *